US011070957B2

(12) United States Patent
Butler, Sr.

(10) Patent No.: US 11,070,957 B2
(45) Date of Patent: *Jul. 20, 2021

(54) SYSTEM FOR ROUTING TEXT MESSAGES (SMS) TO ALLOW FOR TWO-WAY MOBILE TO COMPUTER COMMUNICATION

(71) Applicant: Text 2 Them, Inc., Bowie, MD (US)

(72) Inventor: Alvin Tyrone Butler, Sr., Bowie, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/031,843

(22) Filed: Sep. 24, 2020

(65) Prior Publication Data

US 2021/0014651 A1    Jan. 14, 2021

Related U.S. Application Data

(63) Continuation of application No. 16/573,683, filed on Sep. 17, 2019, now Pat. No. 10,791,434, which is a continuation of application No. 14/988,946, filed on Jan. 6, 2016, now Pat. No. 10,419,898, which is a continuation of application No. 12/928,222, filed on Dec. 7, 2010, now Pat. No. 9,247,400.

(60) Provisional application No. 61/283,699, filed on Dec. 8, 2009.

(51) Int. Cl.
| H04W 4/14 | (2009.01) |
| H04W 4/21 | (2018.01) |
| G06Q 10/10 | (2012.01) |
| H04L 12/58 | (2006.01) |
| H04M 3/42 | (2006.01) |

(52) U.S. Cl.
CPC ............ *H04W 4/14* (2013.01); *G06Q 10/107* (2013.01); *H04L 51/38* (2013.01); *H04W 4/21* (2018.02); *H04M 3/42382* (2013.01)

(58) Field of Classification Search
CPC .......... H04W 4/14; H04W 4/21; H04L 51/38; H04M 3/42382; G06Q 10/107
USPC ....................................................... 455/466
See application file for complete search history.

(56) References Cited

U.S. PATENT DOCUMENTS

| 6,668,179 | B2* | 12/2003 | Jiang ................. H04W 52/0277 455/572 |
| 6,714,793 | B1* | 3/2004 | Carey ..................... H04L 51/04 455/466 |
| 7,319,882 | B2* | 1/2008 | Mendiola ............... G06Q 30/02 455/414.1 |
| 7,343,168 | B2* | 3/2008 | Valloppillil ............. H04W 4/12 455/466 |
| 7,369,865 | B2* | 5/2008 | Gabriel .................. G06Q 20/10 455/406 |

(Continued)

*Primary Examiner* — William Nealon

(57) ABSTRACT

A process and system allowing mobile users to initiate a two-way text message (SMS) conversation with a subscriber's computer. The steps consist of using a mobile user's mobile device to send a SMS containing a keyword and short code to a Short Message Service Center (SMSC), receiving an SMS reply containing an Individual Identification Code Numbers (IICN) which establishes two-way SMS communication between mobile user and business/subscriber. The invention further establishes IICN network which allows businesses to create-a SMS network, previously only available with voice phone networks, providing the Mobile User with the options of auto SMS replay, SMS conversation transfer, or interactive two-way SMS communication with a live SMS operator.

3 Claims, 3 Drawing Sheets

(56) References Cited

U.S. PATENT DOCUMENTS

| | | | | |
|---|---|---|---|---|
| 7,546,131 B1* | 6/2009 | Sidi | ............... | G06Q 10/107 455/466 |
| 7,689,657 B2* | 3/2010 | Daniell | ............... | H04L 51/04 709/206 |
| 7,933,588 B1* | 4/2011 | Goldfinger | ............... | H04L 61/157 455/412.1 |
| 7,983,706 B2* | 7/2011 | Wolter | ............... | H04M 3/5307 455/519 |
| 8,175,522 B1* | 5/2012 | Coleman | ............... | H04M 1/72436 455/11.1 |
| 8,190,182 B2* | 5/2012 | Wu | ............... | H04L 51/043 455/466 |
| 8,200,258 B2* | 6/2012 | Yahav | ............... | H04L 51/066 455/466 |
| 8,244,285 B2* | 8/2012 | Mendiola | ............... | H04W 4/14 455/466 |
| 8,447,977 B2* | 5/2013 | Slick | ............... | H04L 63/08 713/169 |
| 2001/0036810 A1* | 11/2001 | Larsen | ............... | H04W 88/04 455/11.1 |
| 2002/0031206 A1* | 3/2002 | Matsunsami | ............... | H04M 1/72433 379/67.1 |
| 2002/0098855 A1* | 7/2002 | Hartmaier | ............... | H04Q 3/005 455/466 |
| 2002/0123359 A1* | 9/2002 | Wei | ............... | H04M 3/4938 455/466 |
| 2003/0153302 A1* | 8/2003 | Lewis | ............... | H04L 51/12 455/412.1 |
| 2003/0220979 A1* | 11/2003 | Hejl | ............... | H04M 3/5322 709/206 |
| 2004/0082348 A1* | 4/2004 | Gabriel | ............... | H04W 88/184 455/466 |
| 2007/0026879 A1* | 2/2007 | Ala-Luukko | ............... | H04L 51/38 455/466 |
| 2007/0033255 A1* | 2/2007 | Sanjeeva | ............... | H04L 51/04 709/206 |
| 2007/0077949 A1* | 4/2007 | Henderson | ............... | H04W 4/12 455/466 |
| 2007/0149223 A1* | 6/2007 | Liang | ............... | H04L 51/066 455/466 |
| 2007/0167178 A1* | 7/2007 | Al-Harbi | ............... | G06Q 10/02 455/466 |
| 2007/0207819 A1* | 9/2007 | Redpath | ............... | H04L 51/04 455/466 |
| 2007/0249378 A1* | 10/2007 | Midkiff | ............... | H04W 4/14 455/466 |
| 2007/0275743 A1* | 11/2007 | Lovell | ............... | H04W 4/12 455/466 |
| 2008/0126113 A1* | 5/2008 | Manning | ............... | H04L 67/02 455/416 |
| 2008/0132259 A1* | 6/2008 | Vin | ............... | H04L 51/066 455/466 |
| 2008/0261635 A1* | 10/2008 | Samiri | ............... | G06Q 30/02 455/466 |
| 2008/0311882 A1* | 12/2008 | Schlager | ............... | G08B 25/016 455/404.2 |
| 2009/0069040 A1* | 3/2009 | Wiesmuller | ............... | G06Q 20/12 455/466 |
| 2009/0077170 A1* | 3/2009 | Milburn | ............... | G16H 80/00 709/203 |
| 2010/0250672 A1* | 9/2010 | Vance | ............... | G06Q 30/02 709/204 |
| 2010/0268728 A1* | 10/2010 | Tadlock | ............... | G06F 16/58 707/769 |
| 2010/0304766 A1* | 12/2010 | Goyal | ............... | H04L 51/34 455/466 |
| 2011/0060609 A1* | 3/2011 | Meers | ............... | G06Q 30/0283 705/4 |
| 2011/0105095 A1* | 5/2011 | Kedefors | ............... | H04M 1/72403 455/418 |
| 2011/0151899 A1* | 6/2011 | Sanchez | ............... | H04W 4/14 455/466 |
| 2011/0282698 A1* | 11/2011 | Meers | ............... | G06Q 30/0611 705/4 |

* cited by examiner

SYSTEM FOR ROUTING TEXT MESSAGES (SMS) TO ALLOW FOR TWO-WAY MOBILE TO COMPUTER COMMUNICATION

CROSS-REFERENCE TO RELATED APPLICATIONS

The present application is a continuation of U.S. patent application Ser. No. 16/573,683 filed Sep. 17, 2019, which is a continuation of U.S. patent application Ser. No. 14/988,946 filed Jan. 6, 2016, which is a continuation of U.S. patent application Ser. No. 12/928,222 filed Dec. 7, 2010, which claims the benefit of U.S. Provisional Patent Application No. 61/283,699 filed Dec. 8, 2009, the entire contents of each of which are incorporated herein by reference.

FIELD OF THE INVENTION

This invention makes text message communication between cell phone users and organizations and others practical and convenient. The present invention is directed to the field of establishing two-way real time short message (SMS) and Multimedia Messaging Services (MMS) data communications, also known as "text messaging", between the cellphone (text messenger) or other SMS/MMS capable device and desktop computer (subscriber) or other similar device. This is performed through the scanning of text messages searching for keywords forwarding to appropriate company or persons and responding to text messenger with connection options, which then moves the connection to subscriber's desktop device. The invention then establishes two-way real time communication between a mobile device, using email or web based SMS/MMS which is delivered to the mobile device as a text message. Invention further establishes Individual Identity Code Numbers (IICN) for each subscriber which allows mobile devices to enter these IICNs directly and establish two-way chat sessions with various computers thereby establishing the ability to create a text system network similar to a phone system network, inclusive of but not limited to text auto response, transfer and forwarding to two-way text chat with any IICN in the text network.

BACKGROUND OF THE INVENTION

Business Reluctance to Embrace SMS Communications

The growth of SMS (text messaging) has been nothing less than impressive. However, businesses have been reluctant to embrace this communication system. The reason for this is current SMS communications does not fit comfortably with the need of business for mass customer service communication systems. The invention creates a system whereby businesses can use an SMS code, have the message come to their desktop computer and then converts the two-way conversation to an online "chat" system.
Text Messaging of Data Using Mobile Devices Text messaging or "texting" is the common term for the sending of "short" (160 characters or fewer) text messages from mobile phones using the Short Message Service (SMS). It is available on most digital mobile phones and some personal digital assistants with on-board wireless telecommunications. The individual messages which are sent are called "text messages", or in the more colloquial text speak "texts".

Common Short Codes (CSC), also known as "short code" are special telephone numbers of 4-6 characters, significantly shorter than full telephone numbers, which can also be used to address SMS messages from mobile devices. These numbers are designed to be shorter to read out and easier to remember than normal telephone numbers. While similar to telephone numbers, they are, at the technological level, unique to each operator, although providers generally have agreements to avoid overlaps. Short codes are widely used for value-added services such as television voting, ordering ringtones, charity donations and mobile services. Messages sent to short code numbers are generally billed at a higher rate than a standard SMS.

According to Nielsen Mobile, "While the number of calls made on mobile phones has remained steady over the last couple of years, the number of text messages sent and received has risen by a whopping 450%. By the end of 2007, monthly text messaging had just overtaken voice calls 218 to 213. By Q2 2008, an average mobile phone subscriber placed or received 204 calls, compared with sending or receiving 357 text messages every month."
Short Message Service Centre (SMSC)

Messages are sent to a Short Message Service Centre (SMSC) which provides a store-and-forward mechanism. It attempts to send messages to their recipients. If a recipient is not reachable, the SMSC queues the message for later retry. When text messages are sent to an SMSC, the cell phone identity of the caller is available and retrieved in addition to time of call.

Website portals such as "transl8it" have supported a community of users to help standardize this text speak by allowing users to submit translations, staking claim with their user handle, or to submit top messages and guess the lingo phrases. The international popularity of this portal resulted in late 2005 the publishing of the transl8it! dxNRE & glosRE (dictionary & glossary) as the world's first, and most complete, SMS and text lingo book.

Some commonly used acronyms on texting are:
2: To or Too
4: For
brb: Be Right Back
gtg: Got To Go
g2g: Got To Go
ttyl: Talk To You Later
idk: I Don't Know
idc: I Don't Care
lol: Laugh(ing) Out Loud
rofl: Rolls On Floor Laugh(ing)
omg: Oh My God Short message service centers are developing rapidly throughout the world. In 2000, just 17 billion SMS messages were sent; in 2001, the number was up to 250 billion and 500 billion SMS messages in 2004. With carriers charging for each text sent and received, this generated revenues in excess of $50 billion for mobile telephone operators and represented close to 100 text messages for every person in the world. According to Nielson Mobile, a service of the Nielson Company, the typical U.S. mobile subscriber sent and received more SMS text messages than they did voice phone calls in 2008.

While texting is widely popular among the ages of 10-25 year olds in the United States, it is increasing in use among adults and business users as well. According to both the Mobile Marketing Association and Pew Internet & American Life Project Surveys, 40% of US mobile phone users text. The split by age group is as follows: 13-24's: 80% text, 18-27's: 63% text, 28-39's: 31% text, 40-49's: 18% text. The amount of text messages sent in the United States has gone up over the years as the price has gone down to an average of $0.10 per text sent and received. Many providers make unlimited texting available for a lower price.

SUMMARY OF THE INVENTION

Establishing Two-Way Communication Between a Mobile Device and a Computer.

The rapid proliferation of hand held mobile devices coupled with the increase desire for text messaging of conversations and transmitting data has provided the foundation for this new process for acquiring information and establishing a real time, two-way communication between the mobile device and the computer that is practical for business applications.

The text message would be downloaded to a data processing system to allow for a real time history of the conversation to be recorded.

Text messaging, or texting, is the common term for the sending of "short" text messages from mobile devices using the SMS/MMS. It is available on most digital mobile phones and some personal digital assistants with on-board wireless telecommunications. The system of the present invention allows for grouping and classifying text messages to allow for the processing of millions of daily transmissions, thereby eliminating the need for phone operators to answer voice calls and input information.

The invention provides a method of using text messaging to transmit data to a central processing unit to establish two-way communication between a mobile device text user and a business. Once communication is made the text is converted to an email and the two-way communication is established.

Another object of the invention is to capture the cell phone numbers and utilize them later for campaigns, advertising, announcements and/or reminders.

Another object of this invention is to enter directly or upload a customer contact list, inclusive of cell phone number and email address. Another object of this invention is to establish contacts by groups and allow businesses to manage, send and receive multiple text messages from cell phones or other text message devices simultaneously.

Another object of the invention is to send delayed text messages to yourself or others to be delivered at a specific time—a day from now, a week from now, or a year from now.

Another object of the invention is to allow two-way texting where businesses can send text messages from their computer or similar devices to mobile devices and a real time history of the conversation is recorded.

Another object of the invention is to sort and categorize large volumes of transmitted data to allow businesses to send unlimited bulk text messages from their computer or similar device.

DETAILED DESCRIPTION OF THE INVENTION

Figure 1:
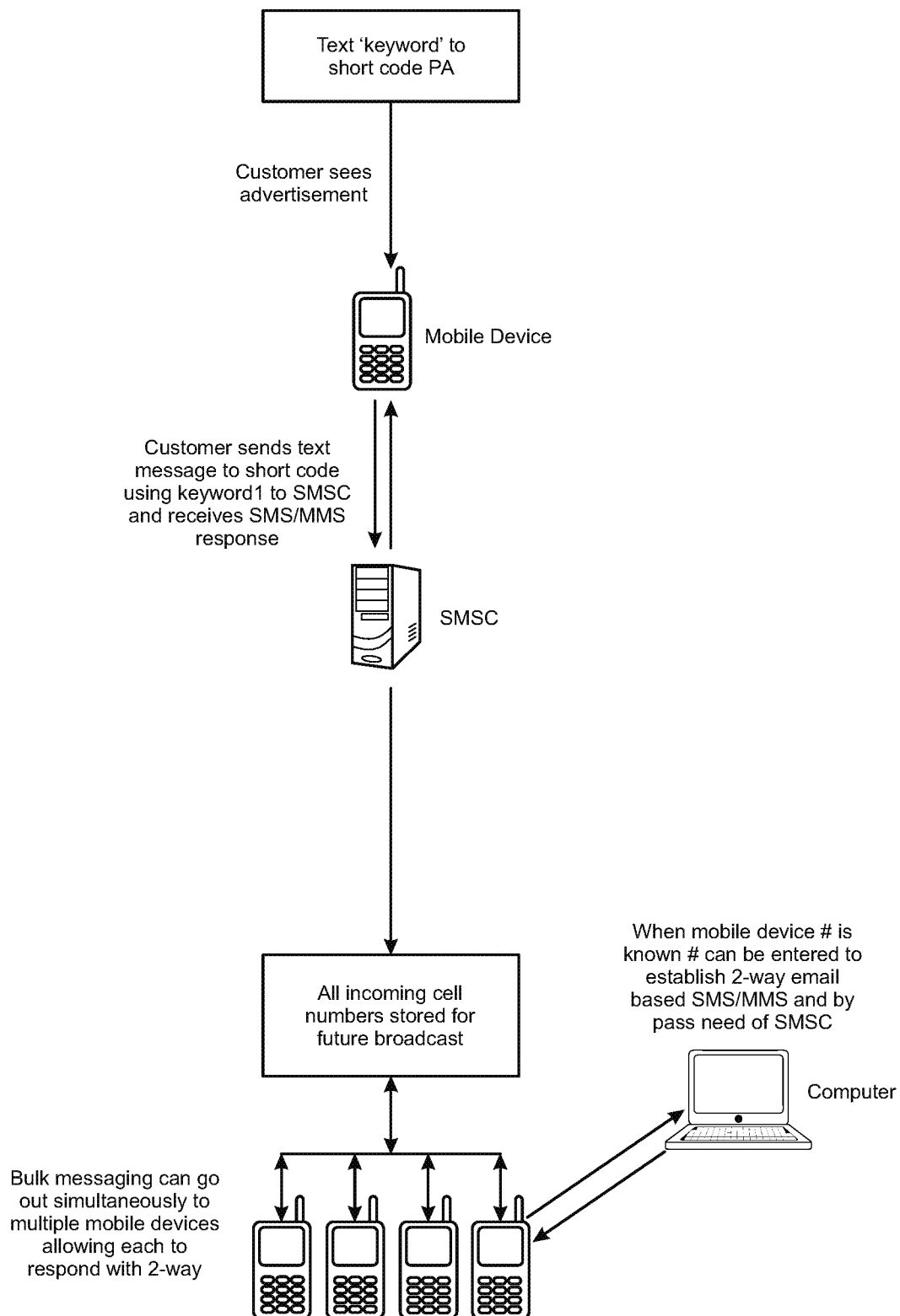
FIG. 1 is a diagram of prior art reporting system.

FIG. 1 illustrates a prior art system for contacting subscriber via SMS communications. When a mobile user sees keyword and short code (1) mobile user can send the keyword to the subscriber and receive and an SMSS/MMS reply (2). Mobile user's phone number is stored (3) in subscribers database for future sending of SMS/MMS messages to mobile user's phone(s). Once mobile user's phone number is known subscriber can also send and receive SMS/MMS messages by web/email based program, with mobile user's mobile device(5).

Figure 2:
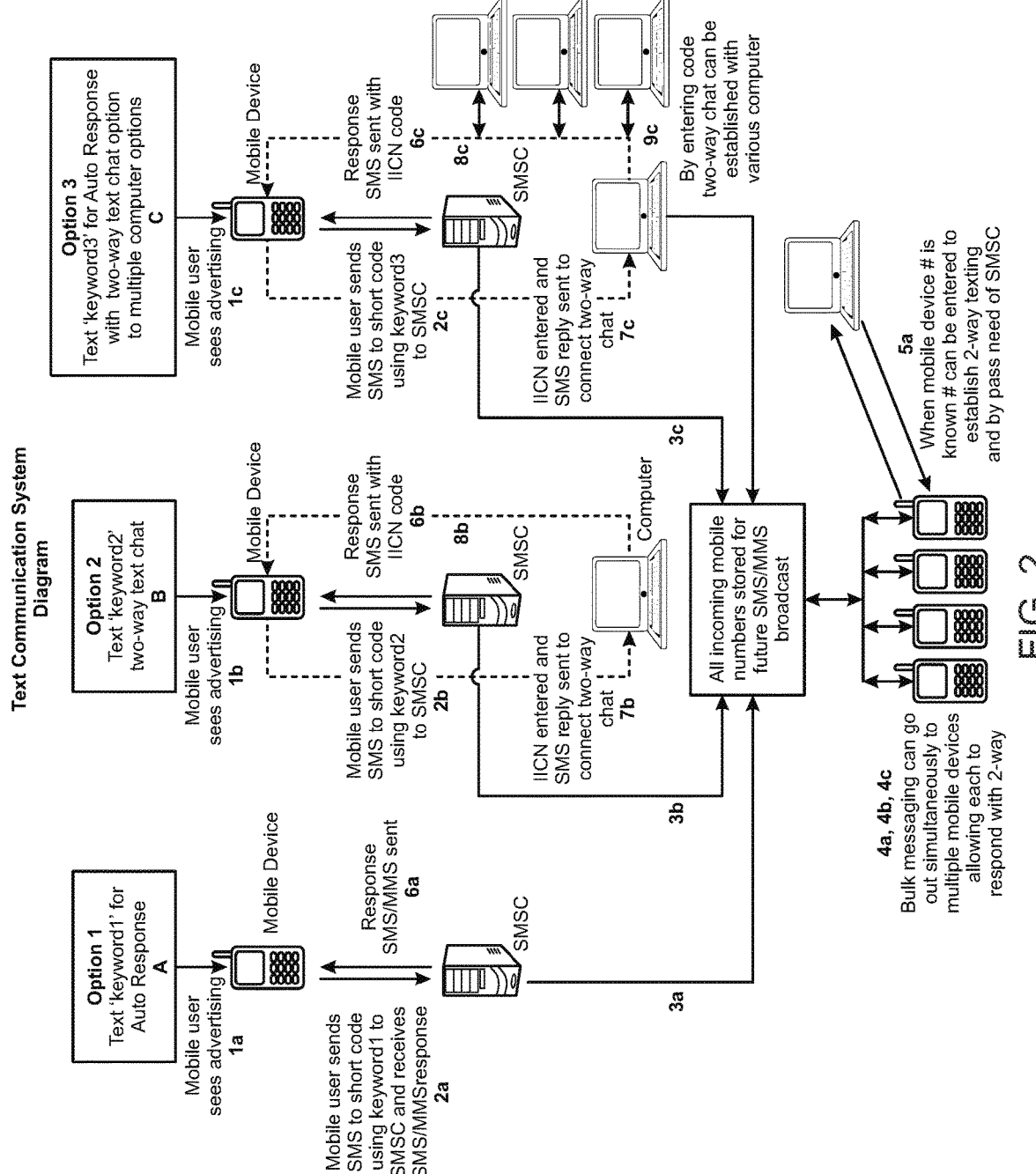
FIG. 2 is a diagram of the reporting system of the present invention.

FIG. 2 illustrates the teachings of the present invention. This invention would also be utilized by, but not limited to, subscribers such as business, schools, emergency operations and others desiring to send and receive SMS/MMS messages direct, real-time, two-way access to and from subscriber and have these messages received on subscriber's computer instead of cell phone. Subscriber has developed multiple options that are executed, depending on keyword used.

In Option 1 (A) when the mobile user sees a subscriber's keywords and short code (1a) and sends a SMS text message to the appropriate SMSC (2a). (for illustration purposes SMSC are shown individually but could be individual or the same in each example). SMSC then sends a SMS/MMS message back to mobile device providing the requested information (6a), Mobile device phone number is stored (3a) for later bulk or individual message broadcast to mobile devices (4a). Once mobile device number is known SMS/MMS messages are also sent and received by computer using an email/web based system of delivery (5a).

In Option 2 (B) when the mobile user sees a subscriber's keywords and short code (1b) and sends a SMS text message to the appropriate SMSC (2b). SMSC then sends a SMS message back to mobile device providing the Individual Identification Code Number (IICN) (6b), By entering IICN into the mobile device (7b) the mobile device is now connected, by two-way text chat (8b) and two-way chat conversation is conducted. This connection is then converted to an email or web based SMS/MMS. Which is delivered as SMS format. Mobile device phone number is also stored (3b) for later bulk or individual message broadcast to mobile devices (4b). Once mobile device number is known SMS/MMS messages can also be sent by entering IICN (7b) without routing through SMSC.

In Option 3 (C) when the mobile user sees a subscriber's keywords and short code (1c) and sends a SMS text message to the appropriate SMSC (2c). SMSC then sends a SMS message back to mobile device providing the Individual Identification Code Number (IICN) (6c). By entering IICN into the mobile device (7c) the mobile device is now connected, by two-way text chat (8c) and two-way chat conversation is conducted. This connection is then converted to an email or web based SMS/MMS which is delivered as a text message. This invention also makes it possible, once mobile device to computer connection is made, for sending of IICN number linking mobile device to various computers (9c) similar to current voice phone network systems. Mobile device phone number is also stored (3c) for later bulk or individual message broadcast to mobile devices (4c). Once mobile device number is known SMS/MMS messages can also be sent by entering IICN (7c) without routing through SMSC.

Figure 3:
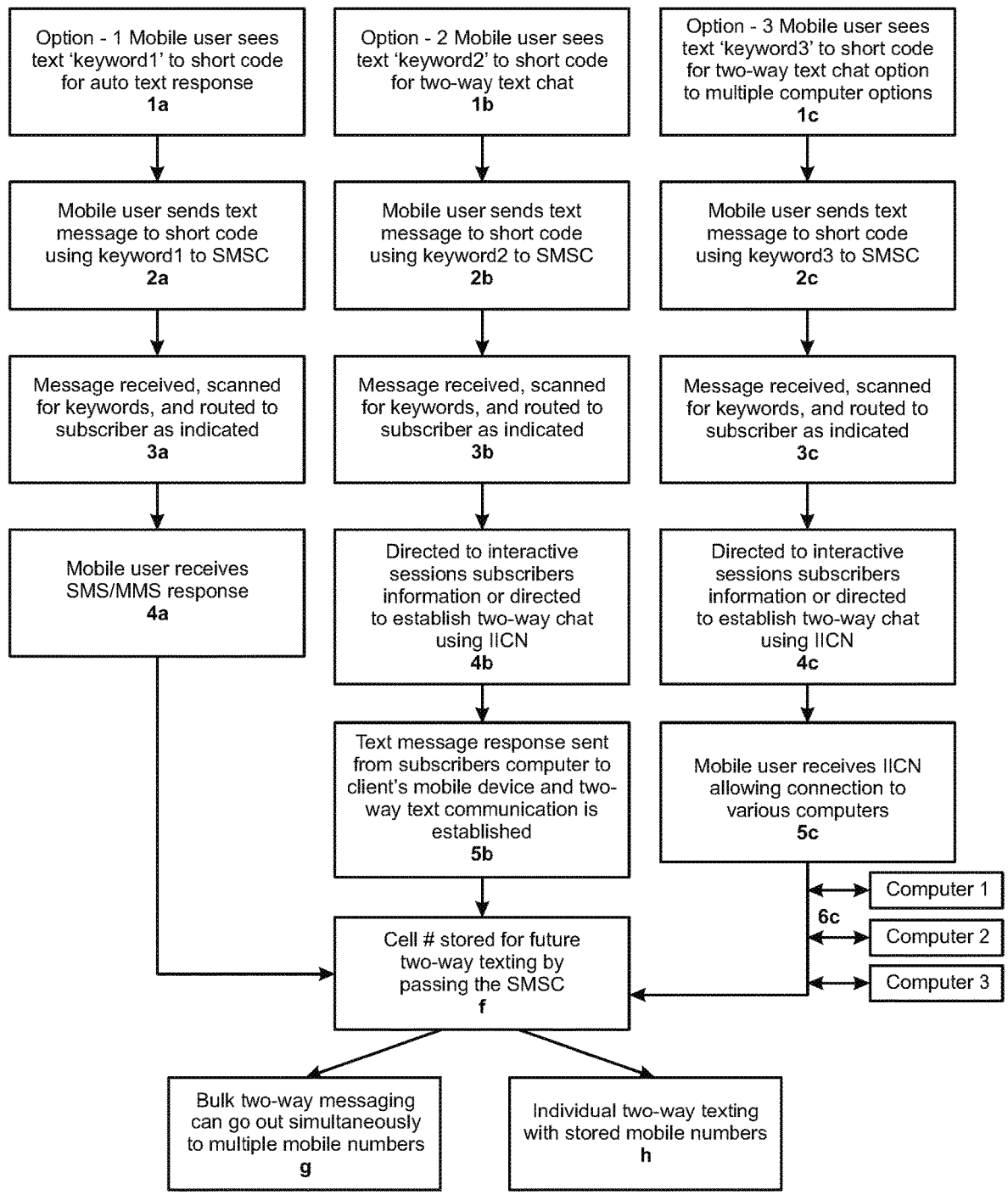
FIG. 3 shows a flow diagram of the present invention

FIG. 3 illustrates a flow chart of the present invention illustrated in FIG. 2. Once a mobile user sees a subscriber's short code and keyword and sends a SMS text message.

Option 1 (1a) keyword containing SMS is sent to appropriate SMSC for processing (2a). The message is scanned for keywords and directed to the correct subscriber (3a). SMSC then sends a SMS/MMS back to mobile device with information (4a). Mobile number is stored (f) for future SMS/MMS messaging to mobile devices (g). Once mobile device number is known SMS/MMS can be sent to mobile (h) device without routing through SMSC (3a)

Option 2 (1b) keyword containing SMS is sent to appropriate SMSC for processing (2b). The message is scanned for keywords and directed to the correct subscriber (3b). SMSC then sends a SMS/MMS back to mobile device with Individual Identity Code Number (IICN) (4b). IICN is entered into reply SMS and two-way chat from mobile device to computer is established. Mobile device phone number is also stored (f) for later bulk (g) or individual message broadcast to mobile devices. Once mobile device number is known SMS/MMS messages can also be sent by entering IICN (4b) without routing through SMSC (3b).

Option 3 (1c) keyword containing SMS is sent to appropriate SMSC for processing (2c). The message is scanned for keywords and directed to the correct subscriber (3c). SMSC then sends a SMS/MMS back to mobile device with Individual Identity Code Number (IICN) (4c). IICN is entered into reply SMS and two-way chat from mobile device to computer is established. Mobile user requests connection to another computer connection and receives IICN by SMS. By entering IICN (6c) connection is established. Mobile device phone number is also stored (f) for later bulk (g) or individual message broadcast to mobile devices. Once mobile device number is known SMS/MMS messages can also be sent by entering IICN (4c) without routing through SMSC (3c).

The foregoing description of the specific embodiments will so fully reveal the general nature of the invention that others can, by applying current knowledge, readily modify and/or adapt for various applications such specific embodiments without departing from the generic concept and, therefore, such adaptations and modifications should and are intended to be comprehended within the meaning and range of equivalents of the disclosed embodiment. It is to be understood that the phraseology or terminology employed herein is for the purpose of description and not limitation. Therefore, while the invention has been described in terms of preferred embodiments, those skilled in the art will recognize that the invention can be practiced with modification within the spirit and scope of the present invention.

What is claimed is:

1. A method of initiating a two-way communication between a mobile device and a subscriber computer, the method comprising:

receiving, by the subscriber computer, a message from a Short Message Service Center (SMSC), the message comprising a keyword, a short code, and information associated with the mobile device;
wherein the keyword and short code are received by the SMSC before the subscriber computer;
wherein the message is sent to the subscriber computer by the SMSC in response to the received keyword and short code; and establishing a two-way conversation between the mobile device and the subscriber computer in response to receiving the message, the two-way conversation excluding the SMSC.

2. The method of claim 1, wherein the text message is received using a multimedia messaging service (MMS).

3. The method of claim 1, wherein the text message comprises any media content supported by the MMS.

\* \* \* \* \*